United States Patent [19]
Yano et al.

[11] Patent Number: 6,021,002
[45] Date of Patent: Feb. 1, 2000

[54] REAL-IMAGE FINDER

[75] Inventors: Takaaki Yano; Tetsuya Abe; Sachio Hasushita, all of Hokkaido, Japan

[73] Assignee: Asahi Kogaku Kogyo Kabushiki Kaisha, Tokyo, Japan

[21] Appl. No.: 09/065,438

[22] Filed: Apr. 24, 1998

[30] Foreign Application Priority Data

Apr. 30, 1997 [JP] Japan ..................................... 9-112420

[51] Int. Cl.⁷ ............................. G02B 27/10; G02B 13/14
[52] U.S. Cl. ............................................ 359/618; 359/355
[58] Field of Search ........................... 359/355, 373–386, 359/618

[56] References Cited

U.S. PATENT DOCUMENTS

5,250,969  10/1993  Abe et al. ................................ 354/219
5,434,636  7/1995  Hasushita et al. .
5,565,950  10/1996  Taguchi et al. .

*Primary Examiner*—Georgia Epps
*Assistant Examiner*—Michael A Lucas
*Attorney, Agent, or Firm*—Greenblum & Bernstein, P.L.C.

[57] ABSTRACT

A real-image finder comprises an objective optical system which forms an image of an object to be viewed; a field frame member located on a primary image forming plane on which the image formed by the objective optical system is formed; an ocular optical system through which the object image formed on the primary image forming plane; and an image erecting optical system which erects the object image formed by the objective optical system. The transparent members are provided on the front and rear surfaces of the field frame, and the thickness of the transparent members are determined so that if a foreign matter sticks to the end surfaces of the transparent members that are opposite to and located away from the field frame member, no foreign matter can be viewed through the ocular optical system.

6 Claims, 7 Drawing Sheets

ASTIGMATISM

Fig.5B

DISTORTION

ASTIGMATISM

Fig. 8B

DISTORTION

REAL-IMAGE FINDER

BACKGROUND OF THE INVENTION

1. Field of the Invention

The present invention relates to a real-image finder through which an erect image is viewed.

2. Description of the Related Art

It is known for a real-image finder to have an objective optical system, which forms an inverted real image of an object, that is, upside down and reversed from left to right, to be viewed on a primary image forming plane on which an image by an objective optical system is formed, and on which a field frame is arranged to lie; an ocular optical system through which the object image formed on the primary image forming plane can be observed; and an image erecting optical system which reinvertes the above inverted real image to the proper orientation so that the image with the proper orientation is viewed as an erect image.

In the above mentioned real-image finder, if a foreign matter, such as dust, exists in the vicinity of the field frame, the foreign matter is viewed together with the object image through the ocular optical system. To prevent this, predetermined members for the finder are placed in a predetermined sealed casing. Consequently, foreign matters are prevented from entering the sealed casing, so that the primary image forming plane is in a dust-free environment. However, the above mentioned sealing operations have to be carried out in a dust-free environment such as a clean room. In particular, an increasing number of cameras have been employing LCDs (liquid crystal displays) which have an inherent tendency to attract foreign matter due to static electricity. Accordingly, the possibility of foreign matter sticking to the LCD, i.e., the field frame, during the sealing operations has been increased. Moreover, once the field frame is sealed, it is difficult to adjust the position of the field frame.

SUMMARY OF THE INVENTION

It is an object of the present invention to provide a real-image finder in which no foreign matter sticks to the primary image forming plane or the vicinity thereof.

The present invention is based on the inventors' findings that if thick-transparent members, which are thicker than a predetermined thickness, are cemented to the front and rear surfaces of the field frame, no foreign matter can enter in the vicinity of the field frame, and hence the problems with dust are easily solved.

According to the present invention, there is provided a real-image finder, comprising an objective optical system which forms an image of an object to be viewed; a field frame located on a primary image forming plane on which the image formed by said objective optical system is formed; an ocular optical system through which the object image formed on the primary image forming plane is viewed; and an image erecting optical system which erects the object image formed by the objective optical system; wherein transparent members are provided on the front and rear surfaces of said field frame, and the thickness of said transparent members are determined so that if a foreign matter sticks to the end surfaces of the transparent members that are opposite to and located away from the field frame, no foreign matter can be viewed through the ocular optical system.

The "thickness" of the transparent members can be defined by the following conditions:

$$9 < |L_1/(f_e^2/1000)| < 15 \quad (1)$$

$$9 < |L_2/(f_e^2/1000)| < 15 \quad (2)$$

wherein:

$L_1$ (mm) designates the reduced optical path length between the primary image forming plane and the end surface of the transparent member located on the object optical system side as viewed from the primary image forming plane;

$L_2$ (mm) designates the reduced optical path length between the primary image forming plane and the end surface of the thick transparent member located on the eyepiece side as viewed from the primary image forming plane;

$f_e$ (mm) designates the focal length of the ocular optical system.

Preferably, the cemented optical element comprising the field frame and the transparent members is separately constructed from the image erecting optical system. Consequently, the position of the field frame can be adjusted by adjusting the position of the cemented optical element.

For example, an LCD (liquid crystal display) can be used as the filed frame. The transparent member can be composed of a lens or a plane-parallel plate.

The present disclosure relates to subject matter contained in Japanese Patent Application No. 09-112420 (filed on Apr. 30, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
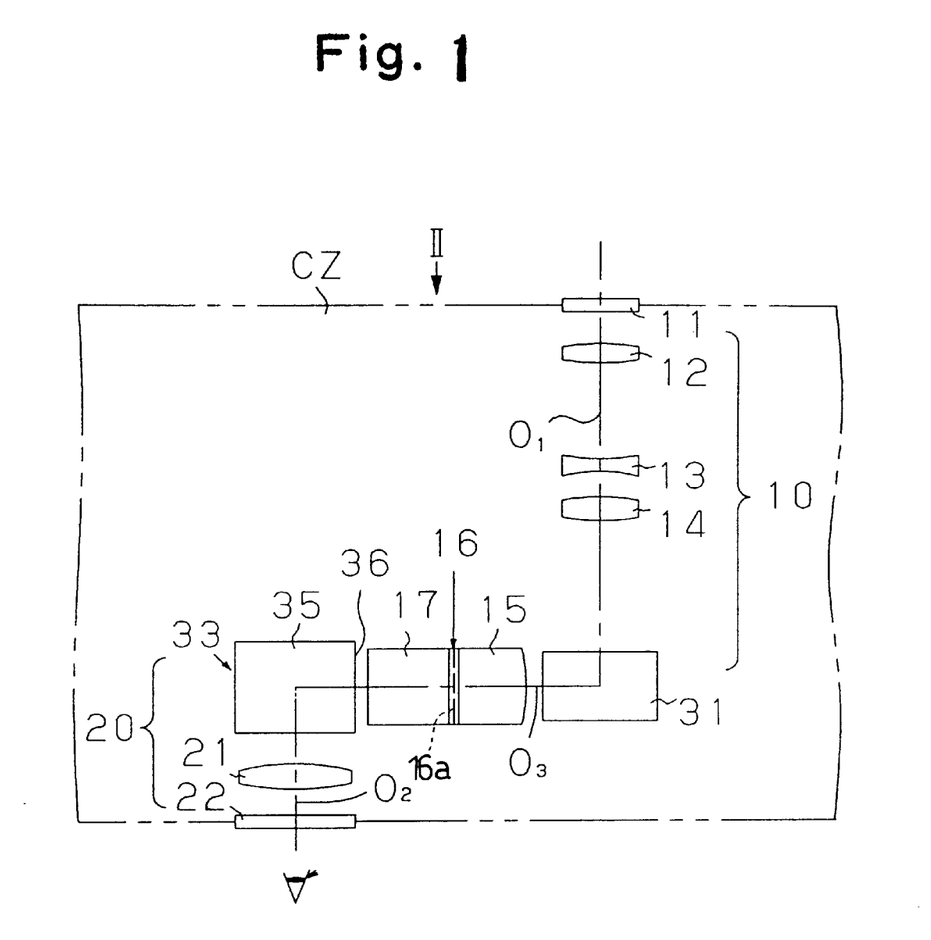
FIG. 1 is a plan view of a real-image finder according to the present invention.
Figure 2:
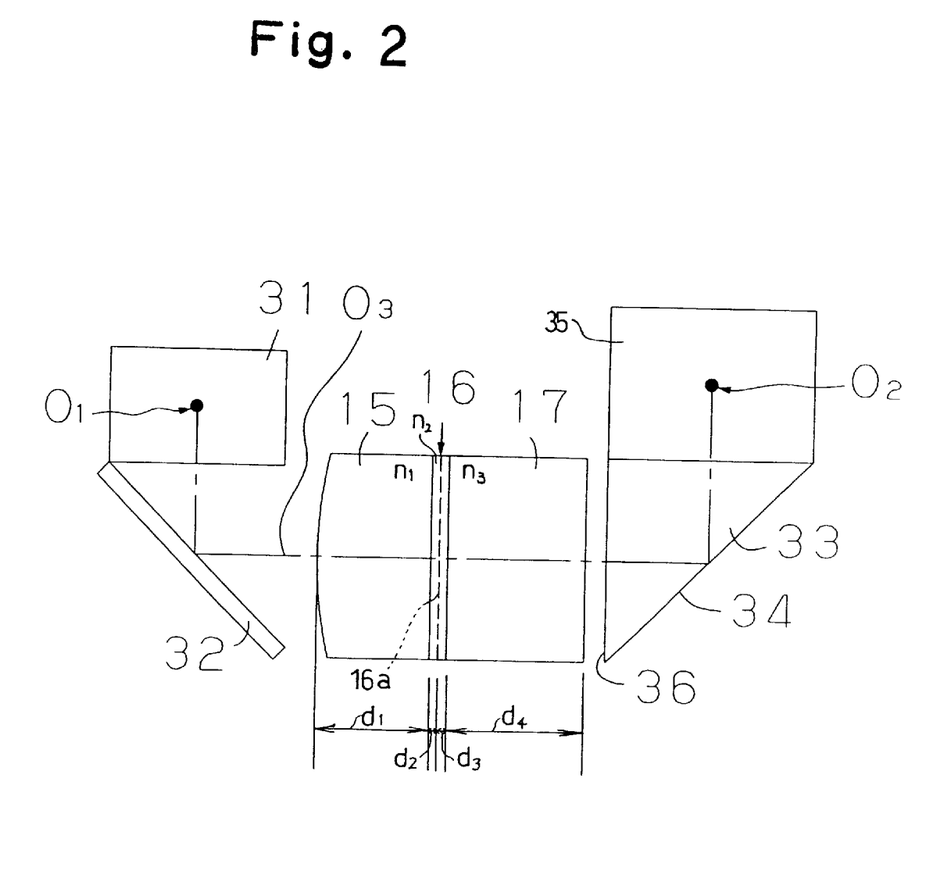
FIG. 2 is a front end view of FIG. 1, viewed from the direction indicated by the arrow II.

The real-image finder shown in FIGS. 1 and 2, according to the present invention, is a finder applied to a lens shutter type camera CZ, in which the optical axis $O_1$ of an objective optical system 10 extends parallel with the optical axis $O_2$ of an ocular optical system 20. Light incident upon the objective optical system 10 proceeds along the optical axis $O_1$, is downwardly bent by a first mirror 31, and is further bent by a second mirror 32 to proceed along the optical axis $O_3$. Thereafter, the light is upwardly bent by a third reflection surface 34 provided on a prism 33 and is further bent by a fourth reflection surface 35 to proceed along the optical axis $O_2$. The four reflecting surfaces, which are the first mirror 31, the second mirror 32, the third reflection surface 34, and the fourth reflection surface 35, constitute an image erecting optical system. It should be noted that the "downward" direction refers to the direction into the page in FIG. 1, and refers to the downward direction in FIG. 2.

The objective optical system 10 is composed of a glass cover 11 and stationary lenses 12, 13 and 14, in this order from the object side. The objective optical system 10 forms a real image of an object to be viewed on a primary image forming plane 16a through which the optical axis $O_3$ passes. Furthermore, a field frame member (LCD) 16 is arranged to locate on the primary image forming plane. The ocular optical system 20 is composed of a stationary lens 21 and a glass cover 22.

On the front and rear surfaces of the field frame 16, a thick lens 15 and a thick plane-parallel plate 17 are provided along the optical axis $O_3$. The thick lens 15 and the thick plane-parallel plate 17, cemented to the field frame member 16, prevent foreign matter from sticking to the primary image forming plane 16a or the vicinity thereof. The operation of cementing the thick lens 15 and the thick plane-parallel plate 17 to the field frame member 16 does not require a special clean room or an equivalent environment. So long as the cementing operation is carefully performed so as not to let foreign matter stick to the surfaces to be cemented, thereby upon completion, the cemented surfaces will be free from any foreign matter. The above cemented optical element, comprising the field frame member 16, the thick lens 15 and the thick plane-parallel block 17, is separately constructed from the image erecting optical system comprising the mirrors 31, 32 and the prism 33, so that the position of the cemented optical element can be adjusted independently of the mirror 31 or 32 or the prism 33.

As shown in FIG. 1, in the direction of the light along the optical axis $O_3$, the four reflection surfaces 31, 32, 33 and 34 of the image erecting optical system are located before and after the cemented optical element comprising the field frame member 16, the thick lens 15 and the thick plane-parallel block 17 in the illustrated embodiment, while the four reflection surfaces can be optionally arranged. Moreover, while the four reflection surfaces are formed by the mirrors and the prism in combination, it is of course possible to form the four reflection surfaces by either using mirrors or using prisms.

Conditions (1) and (2) define the reduced optical path lengths in the above explained real-image finder. Condition (1) defines the reduced optical path length between the primary image forming plane 16a and the end plane of the thick lens 15. Condition (2) defines the reduced optical path length between the primary image forming plane 16a and the end surface of the thick plane-parallel plate 17.

The reduced optical path lengths $L_1$ and $L_2$ defined in conditions (1) and (2) will be explained based on FIG. 2.

Assuming that the refractive index of the thick lens 15 is $n_1$, the length (thickness) of the thick lens 15 along the optical axis is $d_1$, the refractive index of the field frame member 16 is $n_2$, the length (thickness) between the front surface of the field frame member 16 and the primary image forming plane 16a is $d_2$, the length (thickness) between the rear surface of the fired frame member 16 and the primary image forming plane 16a is $d_3$, the refractive index of the thick plane-parallel plate 17 is $n_3$, and the length (thickness) of the thick plane-parallel plate 17 is $d_4$, the reduced optical path lengths $L_1$ and $L_2$ are obtained by the following equations:

$$L_1 = -(d_1/n_1 + d_2/n_2)$$
$$L_2 = d_3/n_2 + d_4/n_3$$

With regard to the direction along which the reduced optical path lengths $L_1$ and $L_2$ lie, it should be noted that the direction from the primary image forming plane 16a toward the objective optical system 10 is considered minus (−) direction while the direction from the primary image forming plane 16a toward the ocular optical system 20 is considered plus (+) direction.

The closer the end surface of the thick lens 15 on the object optical system side approaches the primary image forming plane 16a beyond the lower limit specified in condition (1) (i.e., if the thick lens 15 is thinner than the lower limit in condition (1)), the more the dust stuck to the end surface of the thick lens 15 can be noticed when viewed together with the object image formed on the primary image forming plane 16a through the ocular optical system 20. Likewise, the closer the end surface of the thick plane-parallel plate 17 on the eyepiece optical system side approaches the primary image forming plane 16a beyond the lower limit specified in condition (2) (i.e., if the thick plane parallel plate 17 is thinner than the lower limit in condition (2)), the more the dust which stuck to the end surface of the thick plane-parallel plate 17 can be noticed when viewed together with the object image formed on the primary image forming plane 16a through the ocular optical system 20.

If the end surface of the thick lens 15 on the object optical system side is distant from the primary image forming plane 16a beyond the upper limit specified in condition (1) (i.e., if the thick lens 15 is thicker than the upper limit in condition (1)), or if the end surface of the thick plane-parallel plate 17 on the eyepiece optical system side is distant from the primary image forming plane 16a beyond the upper limit specified in condition (2) (i.e., if the thick plane-parallel plate 17 is thicker than the upper limit in condition (2)), it may be advantageous in terms of dust because no dust can be viewed through the eyepiece optical system, while it is not preferable in terms of the size because the size of the finder inevitably becomes large.

Numerical examples (Embodiments 1 and 2) of the real-image finder of the present invention will be discussed.

Embodiment 1

Figure 3:
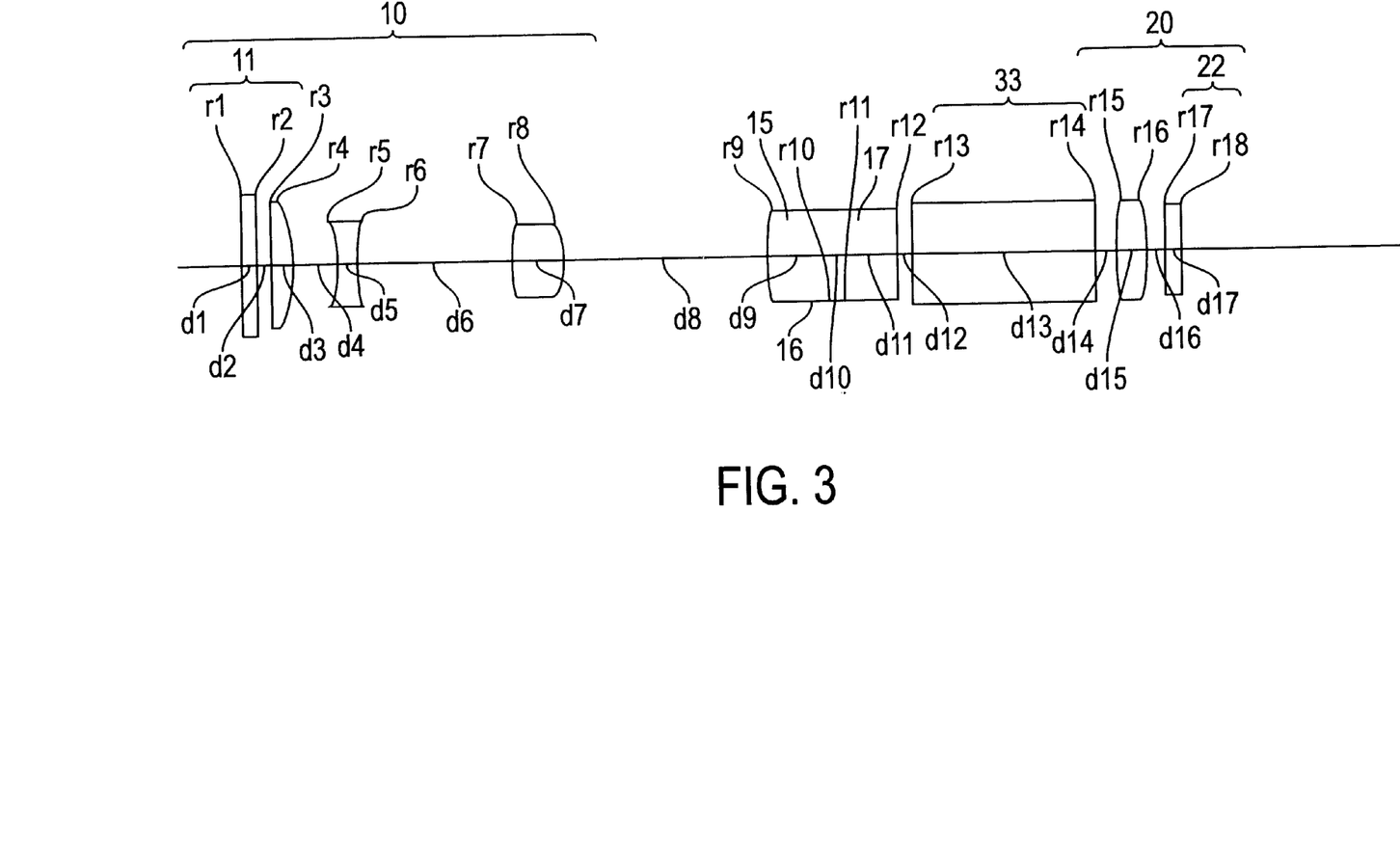
FIG. 3 is a schematic view of a lens arrangement of a real-image finder according to the first embodiment of the present invention.
Figure 4:
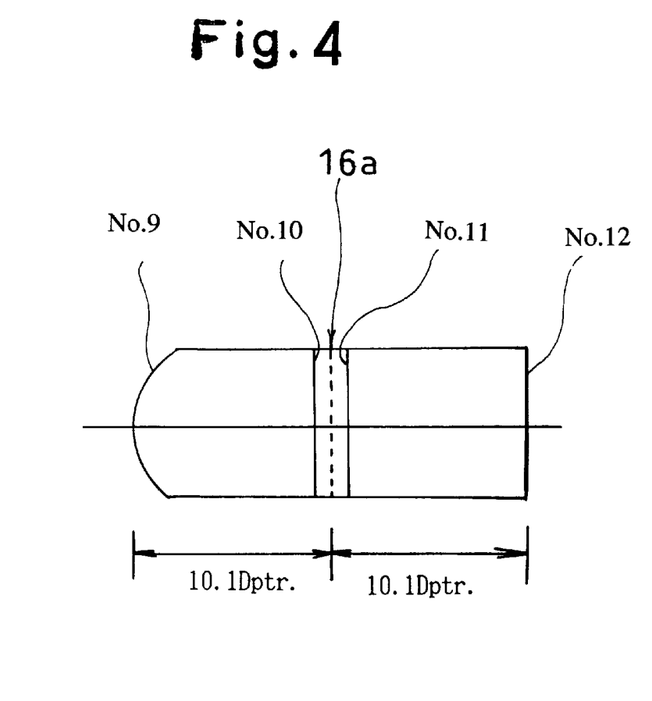
FIG. 4 is an enlarged view of a cemented optical element consisting of a thick lens, a field frame, and a thick plane-parallel plate shown in FIG. 3.
Figure 5A:
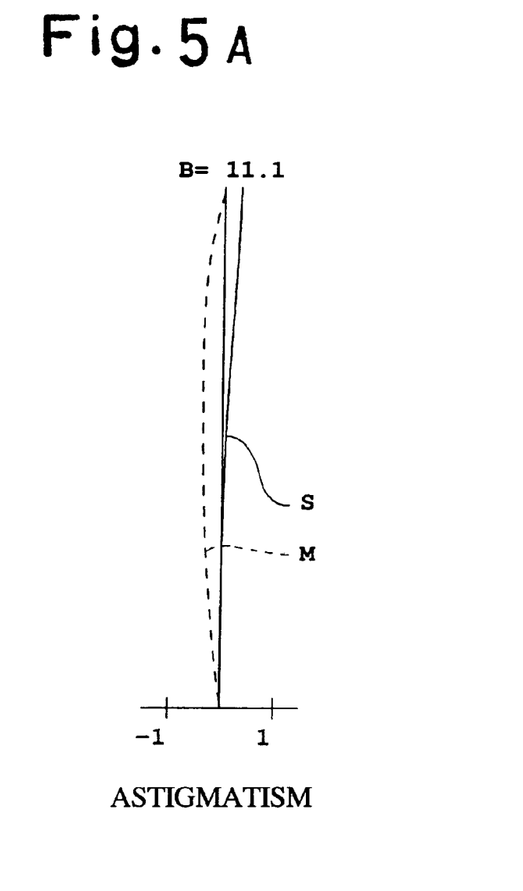
FIGS. 5A and 5B show aberration diagrams of a real-image finder shown in FIG. 3.
Figure 5B:
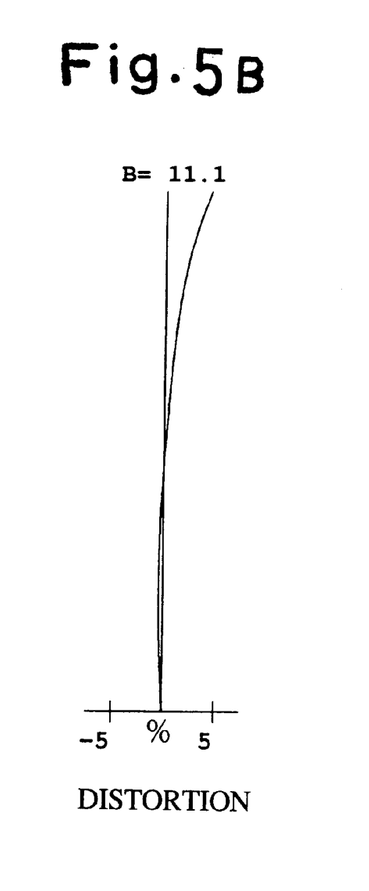

FIG. 3 shows an entire optical system of the first embodiment; FIG. 4 shows an enlarged view of the cemented optical element comprising the thick lens 15, the field frame 16 and the thick plane-parallel plate 17 shown in FIG. 3; and FIG. 5 shows aberration diagrams.

It should be noted that the basic structure of the finder is the same as that of FIG. 1. In FIG. 3, the surface Nos. 1 through 8 correspond to the objective optical system 10 (including the surface Nos. 1 and 2 of the glass cover 11); the surface Nos. 9 through 12 correspond to the cemented optical element composed of the thick lens 15, the field frame member 16, and the thick plane-parallel plate 17; the surface Nos. 13 and 14 correspond to the prism 33; the surface Nos. 15 through 18 correspond to the ocular optical system 20 (including the surface Nos. 17 and 18 of the glass cover 22). The primary image forming plane 16a lies in a median plane (center) of the field frame member 16. Furthermore, in FIG. 4, the two diopter values (10.1 Dptr.) respectively indicate;

(i) the difference of the diopter values between the end surface of the thick lens 15 and the primary image forming plane 16a, (ii) the difference of the diopter values between the end surface of the plane-parallel plate 17 and the primary image forming plane 16a.

Numerical data of the real-image finder shown in FIG. 3 are shown in Table 1. In the table and the drawings, "W" represents the angle of view, "Dptr." represents the diopter, "S" represents the Sagittal image plane, and "M" represents the Meridional image plane. Also, "R" represents the radius of curvature, "D" represents the lens thickness or distance between the lenses, "$N_d$" represents the refractive index of the d-line, and "$v_d$" represents the Abbe number.

The shape of an aspheric plane can be generally expressed as follows.

$$X=CY^2/\{1+[1-(1+k)C^2Y^2]^{1/2}\}+A4Y^4+A6Y^6+A8Y^8+A10Y^{10}+\ldots$$

wherein,

Y designates a height above the axis,

X designates a distance from a tangent plane of an aspherical vertex,

C designates a curvature of the aspherical vertex (1/r), k designates a conic constant, A4 designates a fourth-order aspherical factor, A6 designates a sixth-order aspherical factor, A8 designates a eighth-order aspherical factor; and, A10 designates a tenth-order aspherical factor.

TABLE 1

W = 11.1°
Dptr. = −1 diopter

| plane No. | R | D | $N_d$ | $v_d$ |
|---|---|---|---|---|
| 1 | ∞ | 1.500 | 1.49176 | 57.4 |
| 2 | ∞ | 1.400 | — | — |
| 3* | 63.010 | 2.077 | 1.49176 | 57.4 |
| 4 | −13.356 | 4.110 | — | — |
| 5* | −8.121 | 1.545 | 1.58547 | 29.9 |
| 6 | 15.000 | 14.009 | — | — |
| 7* | 17.507 | 4.500 | 1.49176 | 57.4 |
| 8 | −10.593 | 18.477 | — | — |
| 9* | 15.447 | 5.800 | 1.49176 | 57.4 |
| 10 | ∞ | 0.800 | 1.51633 | 64.1 |
| 11 | ∞ | 5.800 | 1.49176 | 57.4 |
| 12 | ∞ | 1.000 | — | — |
| 13 | ∞ | 17.300 | 1.49176 | 57.4 |
| 14 | ∞ | 1.796 | — | — |
| 15* | 25.783 | 3.000 | 1.49176 | 57.4 |
| 16 | −15.587 | 1.600 | — | — |
| 17 | ∞ | 1.500 | 1.49176 | 57.4 |
| 18 | ∞ | — | — | — |

*designates an aspherical plane with rotation symmetry about the optical axis.
Aspherical data:
No. 3 K = 0.0, A4 = −0.16790 × $10^{-3}$, A6 = −0.12540 × $10^{-5}$
No. 5 K = 0.10915 × 10, A4 = 0.90192 × $10^{-3}$, A6 = 0.63864 × $10^{-5}$
No. 7 K = 0.0, A4 = −0.29274 × $10^{-3}$, A6 = 0.15031 × $10^{-5}$
No. 9 K = 0.0, A4 = −0.31005 × $10^{-4}$, A6 = −0.36065 × $10^{-5}$
No. 15 K = 0.0, A4 = −0.99710 × $10^{-4}$, A6 = 0.55031 × $10^{-6}$ The numerical values in Embodiment 1 satisfy the conditions (1) and (2), as follows.

$L_1$=−4.152

$L_2$=4.152

$F_e$=20.24 mm $f_e^2/1000$=0.410

$|L_1/(f_e^2/1000)|$=10.1

$|L_2/(f_e^2/1000)|$=10.1

EXAMPLE 2

Figure 6:
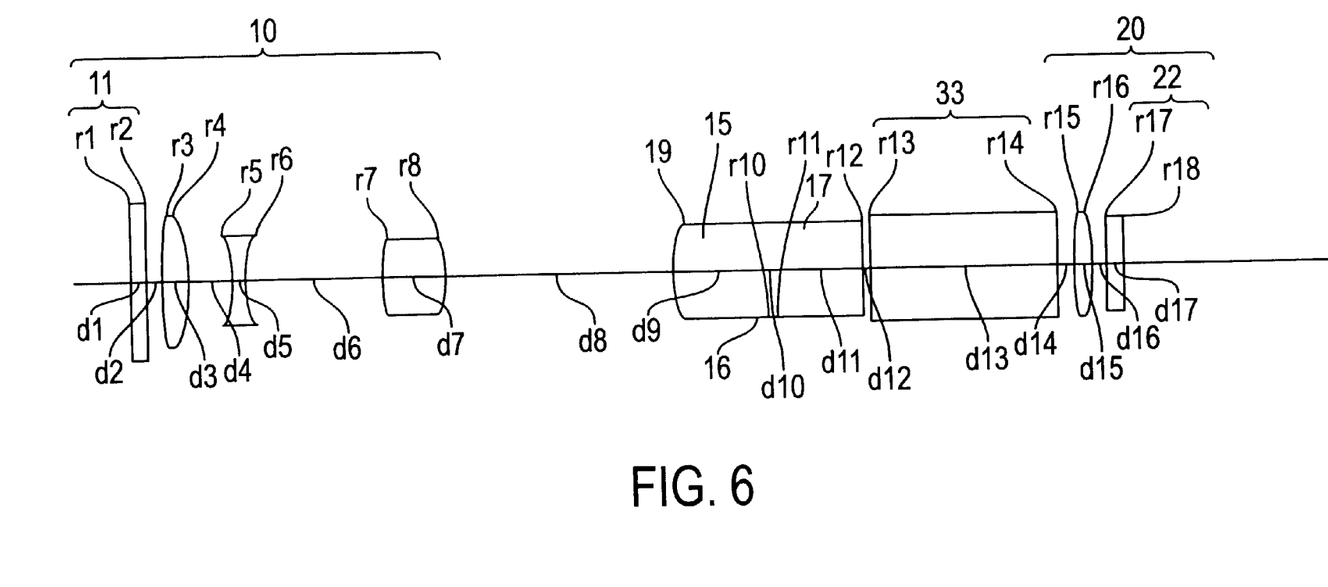
FIG. 6 is a schematic view of a lens arrangement of a real-image finder according to the second embodiment of the present invention.
Figure 7:
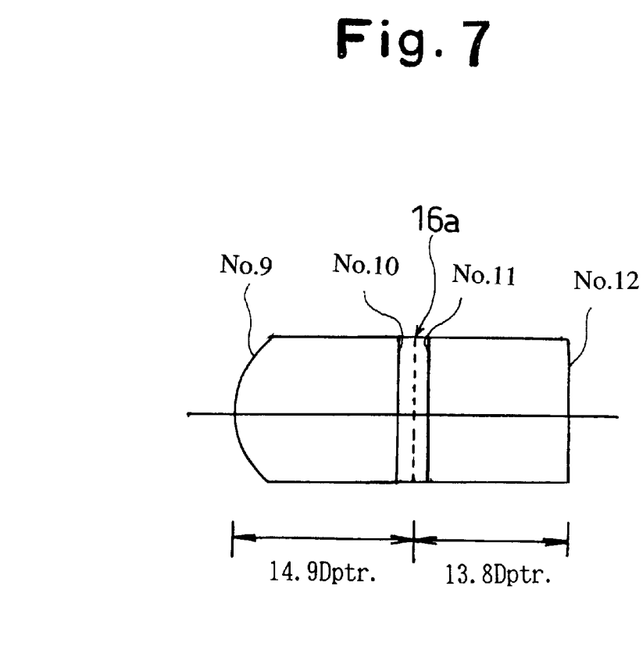
FIG. 7 is an enlarged view of a cemented optical element consisting of a thick lens, a field frame, and a thick plane-parallel plate shown in FIG. 6; and, FIGS. 8A and 8B show aberration diagrams of a real-image finder shown in FIG. 6.
Figure 8A:
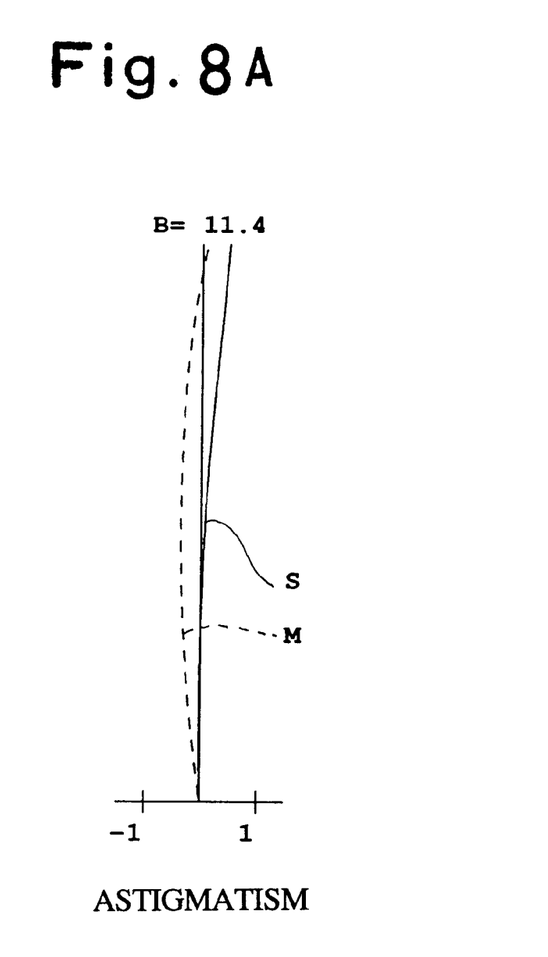
Figure 8B:
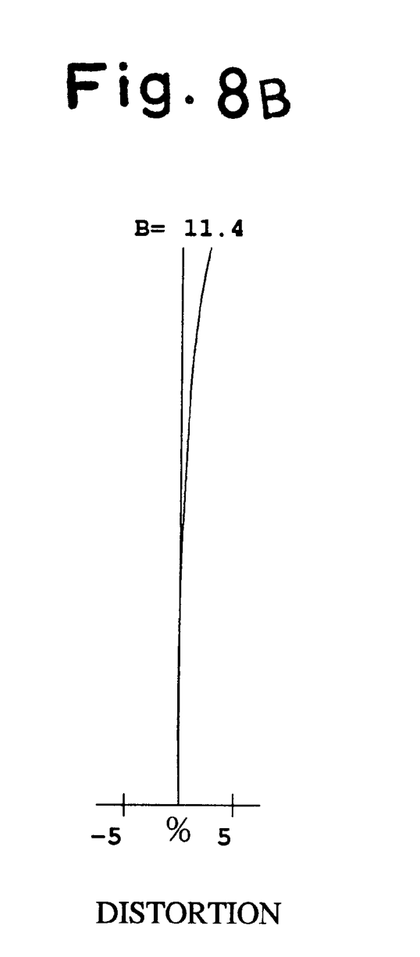

FIG. 6 shows an entire optical system of the second embodiment; FIG. 7 shows an enlarged view of the cemented optical element consisting of the thick lens 15, the field frame 16 and the thick plane-parallel plate 17 shown in FIG. 6; and FIG. 8 shows aberration diagrams. Furthermore, in FIG. 7, the two diopter values (14.9 Dptr.and 13.8 Dptr.) respectively indicate;

(i) the difference of the diopter values between the end surface of the thick lens 15 and the primary image forming plane 16a, (ii) the difference of the diopter values between the end surface of the plane-parallel plate 17 and the primary image forming plane 16a.

Numerical data of the real-image finder shown in FIG. 6 is shown in Table 2. The basic structure is the same as the first embodiment.

TABLE 2

W = 11.1°
Dptr. = −1 diopter

| plane No. | R | D | $N_d$ | $v_d$ |
|---|---|---|---|---|
| 1 | ∞ | 1.500 | 1.49176 | 57.4 |
| 2 | ∞ | 1.400 | — | — |
| 3* | 28.410 | 2.148 | 1.49176 | 57.4 |
| 4 | −18.025 | 4.095 | — | — |
| 5* | −8.417 | 1.067 | 1.58547 | 29.9 |
| 6 | 10.997 | 11.799 | — | — |
| 7* | 19.119 | 5.523 | 1.49176 | 57.4 |
| 8 | −10.325 | 19.843 | — | — |
| 9* | 12.105 | 8.460 | 1.49176 | 57.4 |
| 10 | ∞ | 0.800 | 1.51633 | 64.1 |
| 11 | ∞ | 7.757 | 1.49176 | 57.4 |
| 12 | ∞ | 0.500 | — | — |
| 13 | ∞ | 17.300 | 1.49176 | 57.4 |
| 14 | ∞ | 1.200 | — | — |
| 15* | 25.516 | 1.808 | 1.49176 | 57.4 |
| 16 | −15.526 | 1.200 | — | — |
| 17 | ∞ | 1.500 | 1.49176 | 57.4 |
| 18 | ∞ | — | — | — |

*designates an aspherical plane with rotation symmetry about the optical axis.
Aspherical data;
No. 3 K = 0.0, A4 = −0.99392 × $10^{-4}$, A6 = −0.95172 × $10^{-6}$
No. 5 K = 0.62270, A4 = 0.90365 × $10^{-3}$, A6 = −0.37762 × $10^{-5}$
No. 7 K = 0.0, A4 = −0.27618 × $10^{-3}$, A6 = 0.95921 × $10^{-6}$
No. 9 K = 0.0, A4 = −0.69141 × $10^{-4}$, A6 = −0.54148 × $10^{-6}$
No. 15 K = 0.0, A4 = −0.11126 × $10^{-3}$, A6 = 0.12111 × $10^{-5}$ Aspherical data;

No.3 K=0.0, A4=−0.99392×$10^{-4}$, A6=−0.95172×$10^{-6}$

No.5 K=0.62270, A4=0.90365×$10^{-3}$, A6=−0.37762×$10^{-5}$

No.7 K=0.0, A4=−0.27618×$10^{-3}$, A6=0.95921×$10^{-6}$

No.9 K=0.0, A4=−0.69141×$10^{-4}$, A6=−0.54148×$10^{-6}$

No.15 K=0.0, A4=−0.11126×$10^{-3}$, A6=0.12111×$10^{-5}$

The numerical values in Embodiment 2 satisfy the conditions (1) and (2).

$L_1$=−5.935

$L_2$=5.464

$f_e$=19.92 mm $f_e^2/1000$=0.397

$|L_1/(f_e^2/1000)|$=14.9

$|L_2/(f_e^2/1000)|$=13.8

As explained above, the thick lens 15 and the thick plane-parallel plate 17 are thick transparent members, adhered to the front and rear surfaces of the field frame member 16 in the illustrated embodiments. However, the present invention is not limited to the above structures, it is of course possible to only provide lenses on both surfaces of the field frame member 16, or likewise, plane-parallel plates on both surfaces of the field frame member 16.

According to the present invention, the transparent members are cemented to the front and rear surfaces of the field frame member. With this simple structure, in a real-image finder according to the present invention, no foreign matter such as dust tends to stick to the primary image forming plane or the vicinity thereof and hence, foreign matter can hardly be noticed.

What is claimed is:

1. A real-image finder, comprising,
    an objective optical system which forms an image of an object to be viewed;
    a field frame member located on a primary image forming plane on which said image formed by said objective optical system is formed;
    an ocular optical system through which said object image formed on said primary image forming plane is viewed;
    an image erecting optical system which erects said object image formed by said objective optical system;
    wherein transparent members are cemented directly on the front and rear surfaces of said field frame member, and the thicknesses of said transparent members are determined so that if a foreign matter sticks to the end surfaces of said transparent members that are opposite to and located away from said field frame member, no foreign matter can be viewed through said ocular optical system; and
    wherein said field frame member and said transparent members form a cemented optical element, and said cemented optical element is constructed independently from said image erecting optical system.

2. The real-image finder according to claim 1, wherein it satisfies the following conditions (1) and (2):

$$9 < |L_1/(f_e^2/1000)| < 15 \quad (1)$$

$$9 < |L_2/(f_e^2/1000)| < 15 \quad (2)$$

wherein
    $L_1$ (mm) designates the reduced optical path length between the primary image forming plane and the end surface of the transparent member located on the object optical system side as viewed from the primary image forming plane,
    $L_2$ (mm) designates the reduced optical path length between the primary image forming plane and the end surface of the transparent member located on the eyepiece side as viewed from the primary image forming plane,
    $f_e$ (mm) designates the focal length of the ocular optical system.

3. The real-image finder according to claim 1, wherein the field frame member comprises an LCD (liquid crystal display).

4. The real-image finder according to claim 1, wherein one of said transparent members is a lens.

5. The real-image finder according to claim 1, wherein one of said transparent members is a plane-parallel plate.

6. A real-image finder, comprising,
    an objective optical system;
    a field frame member on which an object image formed by said objective optical system is formed;
    an ocular optical system through which said object image formed on said field frame is viewed; and
    an image erecting optical system which erects said object image formed by said objective optical system;
    said field frame assembly comprising:
        a field frame being located on a primary image forming plane on which said object image is formed;
        a pair of transparent members which are cemented directly on the front and rear surfaces of said field frame member, said transparent members having thicknesses which are determined so that if a foreign matter sticks to the end surfaces of said transparent members that are opposite to and located away from said field frame member, no foreign matter can be viewed through said ocular optical system; and
    wherein said field frame member and said transparent members form a cemented optical element, and said cemented optical element is constructed independently from said image erecting optical system.

* * * * *